US005627223A

United States Patent [19]

Dehennau et al.

[11] Patent Number: 5,627,223
[45] Date of Patent: May 6, 1997

[54] POLYMERIC COMPOSITIONS FOR THE PRODUCTION OF HIGH-FREQUENCY-WELDABLE ARTICLES, MASTER MIXTURE FOR THE PREPARATION OF THESE COMPOSITIONS AND ARTICLES PRODUCED FROM THE LATTER

[75] Inventors: Claude Dehennau; Thierry Depireux, both of Waterloo; Ivan Claeys, Zemst, all of Belgium

[73] Assignee: Solvay (Société Anonyme), Brussels, Belgium

[21] Appl. No.: 113,083

[22] Filed: Aug. 30, 1993

[30] Foreign Application Priority Data

Sep. 1, 1992 [BE] Belgium .............................. 09200774

[51] Int. Cl.$^6$ .............................. B32B 31/28; C08K 3/00
[52] U.S. Cl. .............................. 524/47; 524/52; 524/401; 525/31; 525/64; 156/272.2; 156/274.4
[58] Field of Search .............................. 524/47, 52, 51, 524/394, 401, 81, 50; 525/54.31, 55, 63, 64; 428/532; 156/272.2, 274.4

[56] References Cited

U.S. PATENT DOCUMENTS

| | | | |
|---|---|---|---|
| 3,336,173 | 8/1967 | Renfroe | 156/148 |
| 3,862,265 | 1/1975 | Steinkamp et al. | 425/376 |
| 4,026,967 | 5/1977 | Flexman, Jr. et al. | 255/2 |
| 4,464,443 | 8/1984 | Farrell et al. | 428/688 |
| 4,873,270 | 10/1989 | Aime et al. | 524/52 |
| 4,900,361 | 2/1990 | Sachetto et al. | 524/52 |
| 4,971,864 | 11/1990 | McCord | 428/516 |
| 5,095,054 | 3/1992 | Lay et al. | 524/52 |
| 5,234,977 | 8/1993 | Bastioli et al. | 524/47 |
| 5,262,458 | 11/1993 | Bastioli et al. | 524/52 |
| 5,356,990 | 10/1994 | Pucci | 525/57 |

FOREIGN PATENT DOCUMENTS

| | | |
|---|---|---|
| 2060409 | 8/1992 | Canada . |
| 0408502A2 | 1/1991 | European Pat. Off. . |
| 0408501A2 | 1/1991 | European Pat. Off. . |
| 1669888 | 8/1971 | Germany . |
| 86/07012 | 12/1986 | WIPO . |
| 90/10019 | 9/1990 | WIPO . |
| 91/02025 | 2/1991 | WIPO . |
| 91/16375 | 10/1991 | WIPO . |
| 92/09414 | 6/1992 | WIPO . |

OTHER PUBLICATIONS

Starch: Chemistry and Technology 1965, vol. 1, pp. 451–455 and 467–469; vol. 2, pp. 403–422.
Lide (editor) CRC Handbook of Chemistry and Physics pp. 4–103, 4–90, 71st ed. (1991) The Chemical Rubber Publishing Company.

Primary Examiner—Jeffrey C. Mullis
Attorney, Agent, or Firm—Spencer & Frank

[57] ABSTRACT

The invention relates to polymeric compositions comprising at least one polyolefin, at least one thermoplastic starch and at least one ionic compound, the latter being present in a content such that the concentration of anions and of cations in the composition is from 0.002 to 5 mol/kg. It also relates to the master mixture used for the manufacture of these compositions and containing the thermoplastic starch and the ionic compound. The compositions are suitable, in particular, for the production of mono- or multilayer films which can be used, especially, in the paper-making industry.

13 Claims, No Drawings

POLYMERIC COMPOSITIONS FOR THE PRODUCTION OF HIGH-FREQUENCY-WELDABLE ARTICLES, MASTER MIXTURE FOR THE PREPARATION OF THESE COMPOSITIONS AND ARTICLES PRODUCED FROM THE LATTER

FIELD OF THE INVENTION

The present invention relates to polymeric compositions which are particularly suitable for the production of articles such as especially films or sheets which allow for welds by the welding technique by high-frequency induction.

TECHNOLOGY REVIEW

The property shown by certain thermoplastic materials of making possible welds by the welding technique by high-frequency induction is shown to be particularly advantageous on account of this technique making possible very short welding times while providing high welding strengths.

By way of examples, this property is especially shown by flexible or semi-rigid poly(vinyl chloride) and, to a certain degree, by a rigid poly(vinyl chloride), polyamides 11 and 12, poly(methyl methacrylate) and the copolymers of ethylene and vinyl acetate containing more than 16% by weight of units derived from vinyl acetate. Examples of polymers which are suitable for high-frequency welding are, moreover, mentioned on page 2 of patent application WO/86/07012, published on 4 Dec., 1986.

On the other hand, polyolefins do not accept a high-frequency weld, which penalizes them in certain markets and limits their outlets.

Research has consequently been undertaken to find systems based on polyolefins which can be welded by this technique and has lead especially to the development of mixtures of polyolefins with high-frequency-weldable polymers, such as the copolymers of ethylene and vinyl acetate and the polyamides.

Thus, in U.S. Pat. No. 3,336,173, published on 15 Aug. 1967, high-frequency-weldable compositions are claimed which are composed of a polyolefin and a polyamide.

Such mixtures, however, show certain faults which limit their use. Thus, the polyolefin/copolymer of ethylene and vinyl acetate mixtures are opaque and show a low resistance to scratching the polyolefin/polyamide 11 or 12 mixtures are only translucent and are expensive in view of the price of the materials.

Other systems which can be envisaged combine a polyolefin and a thermoplastic starch obtained by plasticizing a starch. In fact, such mixtures, which generally require resorting to a compatibilizing agent in order to improve their mechanical properties, can be welded at high-frequency if the thermoplastic starch content is very high.

Unfortunately, if the thermoplastic starch content is high, bubbles appear in the vicinity of the weld due to the vaporization of water absorbed by the thermoplastic starch. These faults disappear when the thermoplastic starch content is reduced but then the resistance to the delamination of the weld decreases drastically. It results therefrom that the development of compositions having an acceptable ability to be welded is very uncertain.

SUMMARY OF THE INVENTION

The subject of the present invention is consequently to provide new compatibilized polymeric compositions comprising at least one polyolefin and at least one thermoplastic starch which no longer have the disadvantages mentioned above.

The invention consequently relates to polymeric compositions for the production of high-frequency-weldable articles comprising at least one polyolefin and at least one thermoplastic starch which are characterized in that they comprise at least one ionic compound in a content such that the concentration of anions and of cations in the compositions is from 0.002 to 5 mol/kg.

Concentration of anions and of cations is understood to denote the sum, expressed as moles, of the number of anions and the number of cations present in one kg of composition. To do this, all the anions and cations are individually taken into account.

Generally, it is preferred that the content of ionic compound in the compositions is such that the concentration of anions and of cations is greater than 0.005 mol/kg.

Likewise, it is generally preferred that this concentration does not exceed 4 mol/kg.

The ionic compound which can be used in the compositions according to the invention can be any ionic compound.

Thus, for example, this compound can consist, entirely or in part, of the thermoplastic starch used in the composition, the latter being, in this case, chosen from the group formed by cationic thermoplastic starches and anionic thermoplastic starches.

These ionic thermoplastic starches are obtained by plasticizing ionic starches.

Such starches are described in the work "Starch: Chemistry and Technology", edited by R. L. Whistler and E. F. Paschall, Academic Press, New York and London, Volume 1, 1965, pages 451 to 455 and 467 to 469 and Volume 2, 1967, pages 403 to 422, which is incorporated for reference in the present description.

DETAILED DESCRIPTION OF THE INVENTION

In the case of the use of cationic or anionic starches, it is advisable that the degree of substitution of the hydroxyl functional groups of the starch by radicals carrying ionic groups is sufficient for the concentration of neutralizing ions in the composition to lie between the specified values.

As examples of starches of this type, there can advantageously be used a native starch etherified so as to replace, on average, one hydroxyl group on from 10 to 70, and preferably on approximately 25, anhydroglucose units by an amino alkyl functional group which confers cationic properties on it. A starch of this type is, moreover, marketed under the tradename HI-CAT® 260 by the French Company ROQUETTE FRERES.

Another type of ionic starch which can be advantageously used is a starch esterified so as to replace, on average, one hydroxyl group on from 10 to 70, and preferably on approximately 25, anhydroglucose units by a radical carrying a carboxyl functional group which confers anionic properties on it.

Other ionic starches, of course, can be equally suitable.

The ionic compound can, moreover, be any optionally hydrated inorganic salt which can be incorporated as such or in the form of an aqueous solution. As examples of such salts, there can especially be mentioned sodium chloride, potassium chloride, ammonium chloride and their mixtures which are preferred by the Applicant, this list being, however, purely illustrative and non-limiting. However, in the cases of inorganic compounds, the Applicant prefers to use monovalent salts.

The ionic compound can, finally, be any optionally hydrated organic salt which can also be incorporated as such or in the form of an aqueous solution. As examples of such salts, there can especially be mentioned acetates and lactates, such as sodium acetate and sodium lactate, and their mixtures, which are preferred by the Applicant, this list being, however, also purely illustrative and non-limiting.

The composition according to the invention can contain, at the same time, a cationic or anionic thermoplastic starch and an inorganic ionic compound and/or an organic ionic compound. Any other type of mixture of ionic compounds can be used in the composition according to the invention.

The polyolefin or polyolefins used to produce the compositions in accordance with the invention can also be of any kind and are often chosen from the polymers or copolymers of ethylene or propylene optionally modified. The Applicant, however, prefers to use polyethylenes and, in particular, linear low density polyethylenes (LLDPE), very low density polyethylenes (VLDPE), low density polyethylenes (LDPE) and their mixtures. Good results have been obtained with LLDPE and its mixtures with LDPE.

Generally, the polyolefins content of the compositions in accordance with the invention does not exceed 98% and preferably not 90%, by weight. Their content is generally not less than 10%, and preferably not less than 20%, by weight.

The starches which can be used for producing the thermoplastic starches of the compositions in accordance with the invention can also be of any kind. They can especially be of natural or plant origin and be composed mainly of amylose and/or of amylopectin, depending on their biological origin.

These starches can be destructured, pregelled or modified. They can also form the object of addition of water or of plasticizers, as described in Patent Application WO-90 10 019, published on 7 Sep., 1990. As examples of plasticizers, there can be mentioned, as non-limiting, glycerol, diglycerol, polyglycerols, sorbitol and the mixtures of these. The thermoplastic starch used in the compositions can comprise up to 50% by weight, and preferably from 5 to 45% by weight, of one or a number of plasticizers with respect to the total weight of thermoplastic starch.

Generally, the content by weight of thermoplastic starch in the compositions in accordance with the invention is equal to or less than 60% and preferably equal to or less than 50%.

Generally, at least i %, and most often at least 5%, of thermoplastic starch is used in the compositions in accordance with the invention. The compositions according to the invention can additionally advantageously comprise at least one coupling agent.

The coupling agent, also called compatibilizing agent, can also be of any kind, but the Applicant prefers, however, to use coupling agents chosen from the polyolefins modified by grafting with maleic anhydride and the copolymers and terpolymers of ethylene containing units derived from maleic anhydride. The compositions in accordance with the invention generally comprise from 0.5 to 30% by weight, and preferably from 1 to 20% by weight, of compatibilizing agent.

The compositions in accordance with the invention can, additionally, contain other usual additives such as lubricating agents, stabilizing agents, pigments, dyes, and the like. Their content can be variable. It will often not exceed 10% of the total weight of the composition.

It has additionally been observed that the compositions in accordance with the invention can also contain inorganic filler materials without harming the weldability properties.

The compounding of the compositions in accordance with the invention can be carried out on co- or counterrotary, twin-screw compounders or on external or internal mixers.

Generally, the order or the time of introduction into the hopper of the compounder of the constituents of the composition according to the invention is not critical.

As a non-limiting example, the compounder can be supplied directly with the precompounded thermoplastic starch, the polyolefin, the coupling agent, the inorganic or organic salt, lubricating agents and stabilizing agents, or alternatively with the starch impregnated with its plasticizer, then with the polyolefin and the other components of the mixture, or alternatively with the precompounded thermoplastic starch containing a certain amount of the coupling agent, of the polyolefin and of the ionic compound and then the balance of the coupling agent, of the polyolefin and of the other components.

When the ionic compound comprises an organic or inorganic salt, the latter can be mixed beforehand with the thermoplastic starch or even the precompounder.

The compound thus obtained which contains the thermoplastic starch and the organic or inorganic salt can also be exploited as a master mixture and be incorporated into a polyolefin in so far as the proportions by weight of its constituents are such that the mixing of the compound with the polyolefin leads to a final composition in accordance with the invention.

The compatibilizing agent can, in this case, be present in the compound and thus form part of the master mixture. It can also be used in the stage of incorporation of the polyolefin.

The use of the compositions according to the invention can be carried out by calendering, by extrusion and the like.

The compositions in accordance with the invention can especially be exploited to constitute the internal layer of multilayer structures, for example of sandwich type, in which the external layers consist of polymers which are supposed to be non-weldable at high frequency and thus, nevertheless, lead to multilayer structures which can be welded at high frequency provided that the total thickness of the non-weldable layers does not exceed 85% of the total thickness of the multilayer structure. The compositions according to the invention can also obviously be suitable for the production of multilayer structures of sandwich or other type which can be welded at high frequency in which the compositions according to the invention are used to constitute the external layer(s).

The compositions in accordance with the invention are particularly suitable for the production of mono or multilayers films or sheets which can find applications in many fields such as packaging, paper-making, and the like.

Additionally, the presence of thermoplastic starch in these compositions leads to articles having an improved bioembrittlement with time.

EXAMPLES

The compositions in accordance with the invention are additionally illustrated by the examples of practical implementation which follow in which the concentrations mentioned are concentrations by weight. Examples 1R, 2R and 3R are given by way of comparison.

Example 1R

A physical mixture comprising 56 g of linear low density polyethylene (LLDPE) of trademark DOWLEX® 2047 E (marketed by the Company DOW CHEMICALS) and 14 g of a LOTADER® 3210 ethylene/acrylic ester/maleic anhydride copolymer (marketed by the Company ATOCHEM) is introduced into a BRABENDER® Plastograph laboratory internal mixer conditioned at a constant temperature of 130° C., then mixed for 10 minutes under a pressure of 1 kg/cm$^2$ at a rate of rotation of the arms of 50 revolutions/minute. Approximately 8 g of the molten mass are then withdrawn, cooled and pressed between two sheets of MYLAR® poly (ethylene terephthalate) (produced by the Company DU PONT DE NEMOURS) at the discharge temperature to produce a film with a thickness of 350 µm.

In order to evaluate the high frequency weldability, the film obtained, after withdrawing the poly(ethylene terephthalate) sheets, is cut into two and the portions obtained are pressed against each other between the electrode (110 mm long and 1 mm wide) and the plate of an electronic welding device of MYSTERE® 30 type, capable of providing a working power of 0.9 kW. The high voltage with a frequency of 27.12 MHz is applied for a half-second of pre-welding (with a lesser power) and then for 3 seconds at maximum power.

It is observed that the weld obtained is of very bad quality and that the two pieces of film brought into contact become detached without effort. Moreover, directly after the welding, no heating effect is detected at the site of the welding.

Example 2R

The reaction is carried out as in Example 1 except that the composition of the mixture is 75% ESCORENE® LL1004YB linear low density polyethylene (marketed by the Company EXXON), 12% LOTADER 3210 ethylene/acrylic ester/maleic anhydride copolymer, 5% glycerol and 8% (i.e. approximately 0.6 mol/kg of the composition) sodium acetate (trihydrate salt), and that the high voltage is maintained for 8 seconds.

After withdrawing from the electronic welding device, it is again observed that the portions of film are not in the least welded to each other.

Example 3R

The reaction is carried out as in Example 2 but with a mixture comprising 70% ESCORENE LL1004YB polyethylene, 5% LOTADER 3210 compatibilizing agent, 16.7% of a maize starch rich in amylopectin of WAXILYS® 100 type (marketed by the Company ROQUETTE FRERES), 5.5% sorbitol and 2.8% glycerol.

After withdrawing from the electronic welding device, it is again observed that the portions of film are not in the least welded to each other.

Examples 1R, 2R and 3R show that compositions comprising a polyolefin and a compatibilizing agent or a polyolefin, a compatibilizing agent, a plasticizer and an ionic organic salt or alternatively a polyolefin, a compatibilizing agent and a thermoplastic starch (in low proportion) do not lead to articles which are weldable at high frequency.

Example 4

70 g of a composition containing 45% DOWLEX 2047E LLDPE, 5% LOTADER 3210 compatibilizing agent, 30% WAXILYS 100 starch, 15% sorbitol and 5% sodium acetate trihydrate (concentration of anions and of cations of 0.74 mol/kg) are mixed as described in Example 1.

A film prepared from this composition according to the same procedure as in the preceding examples is welded at high frequency with a power which is 90% of the maximum, a pre-welding time of a half-second (for overheating) and a welding time of 1 second.

After withdrawing from the electronic welding device, it is observed that the welding line is very regular in width and very strong. It is not possible to detach the two portions of sheets by pulling apart because they finish by tearing along the welding line without the weld giving way. Moreover, the sample is transparent, with a slight yellow coloration.

Example 5

The same results are obtained as in Example 4 by replacing the WAXILYS 100 starch with native maize starch. For example, a formulation containing 30% food starch, 40% DOWLEX 2047E polyethylene, 10% LOTADER 3210 compatibilizing agent, 15% polyglycerol and 5% of an 80% aqueous sodium lactate solution gives film portions which weld to each other perfectly in 2 seconds at 70% of the maximum power of the electronic welding device.

Example 6

Excellent welding is also obtained if the reaction is carried out as in Example 4 but starting from a composition comprising 40% DOWLEX 2047E LLDPE, 10% LOTADER 3210 compatibilizing agent, 17.5% polyglycerol and 32.5% HI-CAT 260 cationic starch (marketed by the Company ROQUETTE FRERES). HI-CAT 260 starch is an amylose-rich maize starch modified such that 1% to 1.5% of the hydroxyl-functional groups of the starch are substituted by —O—CH$_2$—CHOH—CH$_2$—N$^+$R$_3$ Cl$^-$ groups. In the composition used, the concentration of Cl$^-$ anions is thus approximately 0.08 mol/kg. Although the quality of the welding is satisfactory, it is observed that the resistance to tearing of the film is less satisfactory, that the transparency is slightly less and that the sample is off-white.

Example 7

The reaction is carried out as in Example 1 but with a composition comprising 41% DOWLEX 2047E polyethylene, 10% LOTADER 3210 compatibilizing agent, 31% WAXILYS 100 starch, 10% sorbitol, 5% glycerol and 3% sodium chloride. This time, the salt concentration is 0.5 mol/kg.

Although not all the salt dissolves in the composition, a very beautiful weld is obtained in 1 second with 90% of the maximum power on a MYSTERE 30 electronic welding device.

Example 8

The reaction is carried out as in Example 7, but replacing sodium chloride with calcium chloride (CaCl$_2$ molar concentration of 0.23 mol per kg of composition).

It is observed that the weld is not quite so good and that the film tears fairly easily along the weld. Moreover, it is markedly less transparent than the sample mentioned in Example 7.

Example 9

The reaction is carried out as in Example 7 but replacing sodium chloride with sodium acetate trihydrate (at the same molar concentration).

It is observed this time that the weld is excellent in 1 second with 80% of the maximum power.

Example 10

A composition is used comprising: 70% ESCORENE LL1004YB LLDPE, 5% LOTADER 3210 compatibilizing agent, 15% WAXILYS 100 starch, 4.5% sorbitol, 3% glycerol and 2.5% sodium acetate trihydrate (i.e. 0.18 mol of salt per kilogram of the composition).

It is observed that a very good quality weld is obtained by applying 90% of the maximum power for 1.5 seconds.

Example 11

If the amount of sodium acetate in the composition of Example 10 is doubled (at the expense of an equal mass of sorbitol), it is observed only that the welding is carried out slightly more slowly (90% of power for 2 seconds).

Example 12

If, on the other hand, the amount of sodium acetate in the composition of Example 10 is reduced to 1.4% of the total mass (by increasing the starch concentration to 15.6% and that of sorbitol to 5%), it is observed that the electronic welding device must operate at 95% of the maximum power for at least 2 seconds for the two film portions to be suitably welded.

Example 13

An excellent weld is obtained at 90% of the maximum power applied for 1.5 seconds between two portions of a film produced as in Example 1 but from a composition comprising 70% linear low density polyethylene of ESCORENE LL1004YB type, 5% LOTADER 3210 compatibilizing agent, 13.5% WAXILYS 100 starch, 4.5% of sorbitol, 2.3% of glycerol, 4.1% sodium acetate trihydrate and 0.6% of sodium chloride (for a total concentration of anions and cations of 0.8 mol/kg).

Example 14

A composition comprising 72.5% ESCORENE LL1004YB polyethylene, 2.5% LOTADER 3210 compatibilizing agent, 15% WAXILYS 100 starch, 5% sorbitol, 3% glycerol and 2% of a 25% aqueous sodium chloride, potassium chloride or ammonium chloride solution is treated according to the procedure described in Example 1.

It is observed that 90% of the maximum power is required for a welding time of 2 seconds to produce a strong weld.

The molar concentrations of sodium chloride, potassium chloride or ammonium chloride in the compositions are respectively 0.085 mol/kg, 0.067 mol/kg and 0.093 mol/kg.

Example 15

A composition is used comprising: 51% ESCORENE LL1004YB linear low density polyethylene, 21.5% low density polyethylene (of the type MCA203 provided by the Company BRITISH PETROLEUM), 2.5% of LOTADER 3210 compatibilizing agent, 14% of WAXILYS 100 waxy maize starch, 4.7% sorbitol, 2.3% glycerol and 4% (0.3 mol/kg of the composition) sodium acetate trihydrate.

It is observed that the weld is of good quality if the maximum power of the electronic welding device is maintained for 2 seconds. The transparency of the sheets is further improved with respect to the LDPE-free compositions (Example 11, for example).

Example 16

A mixture is prepared comprising starch containing a high amylopectin content (WAXILYS 100), polyglycerol and an 80% aqueous sodium lactate solution in the proportions 24:12:5. This physical mixture (WAP) is then compounded on a CLEXTRAL® BC21 extruder to produce granules finally containing 25% WAP, 60% DOWLEX 2047E LLDPE and 15% LOTADER 3210 compatibilizing agent. The material temperature at the extruder outlet is 185° C. From these granules, which thus contain 0.4 mol/kg of anions and of cations, there is finally produced, with a TROESTER® UP30 single-screw extruder, a film with a thickness of 350 µm, this film being directly cooled to 70° C. using a quenching cylinder. The product obtained is yellow-brown but not opaque.

It is observed that the high-frequency weldability of the film is excellent at 90% of the maximum power of the electronic welding device applied for 2 seconds and that this weldability remains good even three months after manufacture of the film without the appearance of bubbles.

Example 17

Granules containing 50% WAP (obtained according to Example 16), 40% DOWLEX 2047E LLDPE, and 10% LOTADER 3210 are compounded on a CLEXTRAL line as shown in Example 16.

A sheath containing three layers of A-B-A type is then coextruded, the core "B" being constituted from these granules and the external layers "A" being produced from DOWLEX 2047E LLDPE.

The mean thicknesses of the sheath produced are respectively 60 µm, 125 µm and 50 µm for the external, median and internal layers.

The closure by high-frequency welding of the sheath can be produced with a MYSTERE 30 welding device while applying 90% of the power for 1.5 seconds (with 0.5 seconds of pre-welding).

It is observed that the weld is excellent although the external layers are supposed to be non-weldable by high frequency.

What is claimed is:

1. In a process for producing a high-frequency-welded article comprising a polymeric composition, the improvement comprising welding a polymeric composition comprising at least three constituents:

(a) at least one polyolefin,
    (b) from 1% up to 50% by weight, compared to the total weight of said composition, of at least one thermoplastic starch, and
    (c) from 0.5% to 30% by weight, compared to the total weight of said composition, of at least one coupling agent (other than said at least one polyolefin) selected from the group consisting of polyolefins modified by grafting with maleic anhydride and copolymers and terpolymers of ethylene containing units derived from maleic anhydride and at least one ionic compound selected from the group consisting of cationic thermoplastic starch, anionic thermoplastic starch, an inorganic ionic compound and an organic ionic compound in a amount such that the concentration of anions and of cations is from 0.002 to 5 mol/kg of said composition.

2. The process according to claim 1, wherein the ionic compound consists, in part, of thermoplastic starch selected from the group consisting of cationic thermoplastic starches and anionic thermoplastic starches.

3. The process according to claim 1, wherein the polyolefin is selected from the group consisting of linear low density polyethylenes (LLDPE), very low density polyethylenes (VLDPE), low density polyethylenes (LDPE) and their mixtures.

4. The process according to claim 1, wherein the thermoplastic starch comprises up to 50% by weight of plasticizers with respect to the total weight of thermoplastic starch.

5. The process according to claim 1, wherein said organic ionic compound is hydrated.

6. polymeric composition for the production of a high-frequency-weldable article of at least three constituents (hereinafter (a), (b), and (c)) including at least one ionic compound in an amount such that the concentration of anions and of cations is from 0.002 to 5 mol/kg of said composition, comprising:

(a) at least one polyolefin, (b) from 1% up to 50% by weight, compared to the total weight of said composition, of at least one thermoplastic starch or at least one ionic thermoplastic starch, and (c) from 0.5% to 30% by weight, compared to the total weight of said composition, of a coupling agent consisting essentially of ethylene/acrylic ester/maleic anhydride terpolymer.

7. A polymeric film prepared by a process consisting essentially of a composition according to claim 6.

8. A high-frequency-weldable article comprising at least two films according to claim 7.

9. A polymeric film consisting essentially of a composition according to claim 6.

10. A high-frequency-weldable article comprising at least two films according to claim 9.

11. The polymeric composition according to claim 6, wherein said ionic compound is a hydrated organic ionic compound.

12. The polymeric composition according to claim 6, wherein said at least one thermoplastic starch is selected from the group consisting of anionic and cationic starches, said starch being said at least one ionic compound.

13. The polymeric composition according to claim 6, wherein said at least one ionic compound is a fourth constituent.

* * * * *